United States Patent
Abdulkader et al.

(10) Patent No.: US 7,496,547 B2
(45) Date of Patent: Feb. 24, 2009

(54) HANDWRITING RECOGNITION USING A COMPARATIVE NEURAL NETWORK

(75) Inventors: Ahmad A. Abdulkader, Redmond, WA (US); Ioannis A. Drakopoulos, Redmond, WA (US); Qi Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/150,852

(22) Filed: Jun. 10, 2005

(65) Prior Publication Data

US 2007/0005537 A1   Jan. 4, 2007

Related U.S. Application Data

(60) Provisional application No. 60/687,036, filed on Jun. 2, 2005.

(51) Int. Cl.
*G06F 15/18* (2006.01)
(52) U.S. Cl. .............................. 706/20; 706/15; 706/48; 382/159
(58) Field of Classification Search .................. 706/20, 706/15, 48; 382/159
See application file for complete search history.

(56) References Cited

U.S. PATENT DOCUMENTS

2002/0150295 A1* 10/2002 Kwok et al. ................ 382/186

OTHER PUBLICATIONS

S. Günter. Multiple classifier systems in offline cursive handwriting recognition. PhD thesis, University of Bern, Jan. 2004. Electronic copy avaiable at google or www.iam.unibe.ch/~fki/publications/public/sguenter.pdf Only p. 1-5 and 54 are included with this office action.*
C. Dwork, R. Kumar, M. Naor, and D. Sivakumar. Rank aggregation revisited. 2001. Manuscript Electronic copy avaiable at google or www.eecs.harvard.edu/~michaelm/CS222/rank2pdf Only p. 1 and 4 are included with this office action.*

(Continued)

*Primary Examiner*—David R Vincent
*Assistant Examiner*—Lut Wong
(74) *Attorney, Agent, or Firm*—Birch, Stewart, Kolasch & Birch, LLP

(57) ABSTRACT

Handwriting recognition techniques employing a personalized handwriting recognition engine. The recognition techniques use examples of an individual's previous writing style to help recognize new pen input from that individual. The techniques also employ a shape trainer to select samples of an individual's handwriting that accurately represent the individual's writing style, for use as prototypes to recognize subsequent handwriting from the individual. The techniques also alternately or additionally employ an intelligent combiner to combine the recognition results from the personalized recognition engine and the conventional recognition engine (or engines). The combiner may use a comparative neural network to combine the recognition results from multiple recognition engines. The combiner alternately may use a rule-based system based on prior knowledge of different recognition engines.

12 Claims, 9 Drawing Sheets

OTHER PUBLICATIONS

Akira Nakamura ("A Method to Accelerate Write Adaptation for On-Line Handwriting Recognition of a Large Character Set" IWFHR-9, Oct. 2004).*

Matti Aksela ("Handwritten Character Recognition: A Palm-top Implementation and Adaptive Committee Experiments" thesis, May 2000), p. 1, 90-96 only.*

Dwork et al ("Rank aggregation revisited", 2001, Manuscript).*

Akira Nakamura ("A Method to Accelerate Writer Adaptation for On-Line Handwriting Recognition of a Large Character Set" IWFHR-9 2004, submitted Apr. 5, 2004).*

Dwork et al ("Rank aggregation revisited", 2001, Manuscript).*

IWFHR9.*

* cited by examiner

HANDWRITING RECOGNITION USING A COMPARATIVE NEURAL NETWORK

RELATED APPLICATIONS

This application is a continuation-in-part application of a U.S. Provisional patent application No. 60/687,036 entitled "Neural Ranking," naming Ahmad Abdulkader et al. as inventors, filed on Jun. 2, 2005, which application is incorporated entirely herein by reference. This application also is related to U.S. patent application Ser. No. 11/150,830 entitled "Personalized Implicit And Explicit Character Shape Adaptation And Recognition," naming Ahmad Abdulkader et al. as inventors, filed on Jun. 10, 2005, which application is incorporated entirely herein by reference.

BACKGROUND OF THE INVENTION

Computers are regularly being used for a variety of purposes throughout the world. As computers have become commonplace, computer manufacturers have continuously sought to make them more accessible and user-friendly. One such effort has been the development of natural input methods. For example, speech recognition permits a user to input data into a computer simply by speaking the data out loud. The phonemes of the user speech then are analyzed to convert it into typewritten text Handwriting recognition alternately allows a user to input data by writing on a digitizer with a stylus to create electronic ink. The computer analyzes the shapes of the ink to convert it into typewritten text.

The advent of handwriting input techniques has been particularly beneficial to computer users who employ an East Asian language. Latin languages typically are written with a phonetic character set or alphabet, where each character represents a particular phonetic sound. Even including punctuation, writing in a Latin language requires only a relatively small number of characters. Most, if not all, of the characters used to write in a Latin language thus can be provided on a keyboard. Many East Asian languages, however, are written using a pictographic character set having thousands of characters. Even a large keyboard cannot contain enough keys for a user to write in an East Asian language.

To address this problem, software developers have created specialized programs for converting alphabetic characters into pictographic characters. For example, a computer user in Japan may type a desired word of data using characters from a phonetic alphabet, such as Hiragana or Katakana (collectively referred to herein as "Kana" characters). The user may then activate a Kana-to-Kanji conversion software application, which provides the user with a selection of possible alternates for the word from the Kanji character set. The user can then select the appropriate Kanji character (or characters), which are stored as the input data. While this type of conversion software has allowed East Asian language users to employ computers, it is cumbersome and slow to use.

The new handwriting input techniques have the potential to free East Asian language users from this type of conversion software. Rather than having to tediously convert phonetic characters to a desired pictographic character with a keyboard, the user may now simply write the pictographic character in electronic ink. The computer will then recognize the desired pictographic character from the electronic ink. For example, East Asian language versions of the Microsoft Windows XP Tablet PC operating system provide a special user interface for receiving data from natural input methods. This type of user interface, sometimes referred to as a "TIP" (for text input panel or tablet input panel), includes a handwriting input area. The handwriting area corresponds to an area of a digitizer onto which a user can write with a stylus to create electronic ink. This electronic ink is then "recognized," that is, converted to character data.

While these types of natural input techniques can be very convenient for East Asian language users, their usefulness depends upon their recognition accuracy. Some handwriting recognition tools are very accurate for printed East Asian pictographic characters (i.e., where a user lifts the stylus from the digitizer between each stroke making up the pictographic character). It is more difficult, however, for conventional handwriting recognition tools to accurately recognized cursive East Asian pictographic characters (i.e., where a user does not lift the stylus from the digitizer between writing each stroke forming the pictographic character). With cursive writing, a person's individual writing style will have a more pronounced impact on the appearance of a character. Moreover, even a single person may draw different shapes each time that an East Asian pictographic character is written. For example, FIG. 1 illustrates ten cursive samples of the Chinese character 箭 (meaning "arrow") obtained from the same writer. As seen from this figure, it may be difficult for even a human reader to recognize each of these character samples as representations of the same Chinese character for "arrow."

BRIEF SUMMARY OF THE INVENTION

Advantageously, various aspects of the invention relate to handwriting recognition techniques that can be personalized to more accurately recognize characters written in an individual's handwriting style. According to some implementations of the invention, the handwriting recognition techniques will distinguish samples of an individual's handwriting that are representative of that individual's writing style from samples of the individual's handwriting that are not representative of the individual's writing style. These handwriting recognition techniques can then employ the representative samples of the individual's handwriting as user-specific handwriting prototypes to more accurately recognize that individual's handwriting. Some implementations of the invention may alternately or additionally use samples of the individual's handwriting to select generic prototypes that match the individual's writing style.

With some implementations of the invention, the handwriting recognition techniques may explicitly obtain samples of an individual's handwriting. Still other implementations of the invention may alternately or additionally obtain samples of the individual's handwriting through implicit methods. Various implementations of the invention may employ any combination of an online and offline trainer based on the number of samples and computational resources available. The online trainer may continuously train a handwriting recognition system as an individual's handwriting samples are collected, or as the individual uses the system. The offline trainer may then train a handwriting recognition system when a certain number of user samples have been collected. The online trainer provides fast response to improve the recognition accuracy, while the offline trainer provides better overall accuracy improvement.

Various aspects of the invention also relate to handwriting recognition techniques that compare the results from multiple handwriting recognition engines to produce a single recognition output. With some implementations of the invention, the results of each handwriting recognition engine are normalized and then compared to determine the optimum recognition selection. For still other implementations of the invention, a comparative neural network is trained to compare the recognition results of multiple recognition engines. The trained neural network is then used to determine the optimum recognition output from among recognition results of the different recognition engines.

These and other features and advantages of different implementations of the invention will be described in more detail below.

DETAILED DESCRIPTION OF THE INVENTION

Overview

Various aspects of the invention relate to techniques for handwriting recognition techniques. These techniques offer improved recognition accuracy over conventional handwriting techniques by employing a personalized handwriting recognition engine. This type of recognition engine uses examples of an individual's previous writing style to help recognize new pen input from that individual. Some implementations of the invention also will employ a shape collector (embedded in the overall trainer system) to collect samples of an individual's handwriting that accurately represent the individual's writing style. The shape trainer will select samples of an individual's handwriting that accurately represent the individual's writing style, and use these samples as prototypes to recognize subsequent handwriting from the individual.

Other implementations of the invention may alternately or additionally employ one or more conventional recognition engines that use generic information to recognize handwriting. In some of these implementations, the shape trainer will use an individual's handwriting samples to select generic prototypes (e.g., prototypes provided by conventional recognition engines) that are similar to the individual's writing style.

With the various examples of the invention, the handwriting techniques may employ an intelligent combiner to combine the recognition results from the personalized recognition engine and the conventional recognition engine (or engines). With some embodiments of the invention, the combiner may be use a comparative neural network to combine the recognition results from multiple recognition engines. For still other examples of the invention, the combiner may use a rule-based system based on prior knowledge of different recognition engines. More specifically, the combiner used in these implementations may normalize the recognition output results from the different recognition engines before selecting an optimum recognition result. The various features and operation of different examples of the invention will be discussed in greater detail below.

Implementation Environment

As will be appreciated by those of ordinary skill in the art, various examples of the invention may be implemented using analog circuitry. More commonly, however, embodiments of the invention will be implemented using a programmable computing device executing programming or "software" instructions. Accordingly, one example of this type of implementation environment for various embodiments of the invention will now be described with regard to FIGS. 2 and 3.

Figure 2:
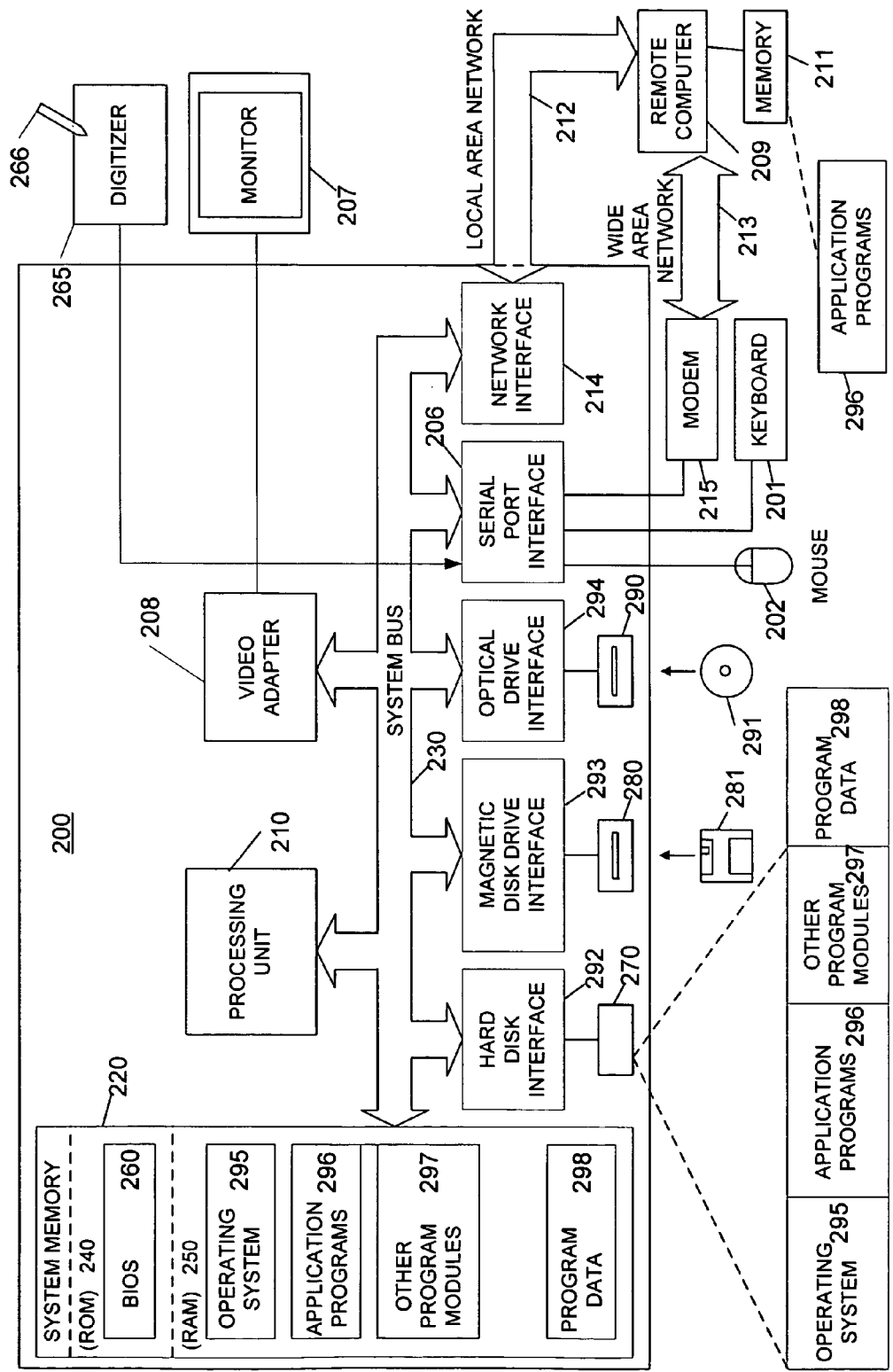
FIGS. 2 and 3 show examples of an operating environment that can be used to implement handwriting recognition techniques according to various examples of the invention.

FIG. 2 illustrates one example of a general-purpose digital computing environment that can be used to implement various embodiments of the invention. In particular, FIG. 2 shows a schematic diagram of a computer 200. The computer 200 typically includes at least some form of computer readable media. Computer readable media can be any available media that can be accessed by the computer 200. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the computer 200.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 2, the computer 200 includes a processing unit 210, a system memory 220, and a system bus 230 that couples various system components including the system memory 220 to the processing unit 210. The system bus 230 may be any of several types of bus structures including a memory bus or memory controller, a peripheral bus, and a local bus using any of a variety of bus architectures. The system memory 220 may include read only memory (ROM) 240 and random access memory (RAM) 250.

A basic input/output system (BIOS) 260 contains the basic routines that help to transfer information between elements within the computer 200, such as during start-up, is stored in the ROM 240. The computer 200 also may include a hard disk drive 270 for reading from and writing to a hard disk (not shown), a magnetic disk drive 280 for reading from or writing to a removable magnetic disk 281, and an optical disk drive 290 for reading from or writing to a removable optical disk 291, such as a CD ROM, DVD ROM, or other optical media. The hard disk drive 270, magnetic disk drive 280, and optical disk drive 290 are connected to the system bus 230 by a hard disk drive interface 292, a magnetic disk drive interface 293, and an optical disk drive interface 294, respectively. These drives and their associated computer-readable media provide nonvolatile storage of computer-readable instructions, data structures, program modules, and other data for the personal computer 200. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 281, optical disk 291, ROM 240, or RAM 250, including an operating system 295, one or more application programs 296, other program modules 297, and program data 298. A user can enter commands and information into the computer 200 through input devices, such as a keyboard 201 and pointing device 202 (such as a mouse). Other input devices (not shown) may include a microphone, joystick, game pad, satellite dish, scanner, or the like. These and other input devices are often connected to the processing unit 210 through a serial port interface 206 that is coupled to the system bus 230, but they also may be connected by other interfaces, such as a parallel port, game port, or a universal serial bus (USB), and the like. Further still, these devices may be coupled directly to the system bus 230 via an appropriate interface (not shown).

A monitor 207 or other type of display device also may be connected to the system bus 230 via an interface, such as a video adapter 208. In addition to the monitor 207, personal computers typically include other peripheral output devices (not shown), such as speakers and printers. In one example, a pen digitizer 265 and accompanying pen or stylus 266 are provided in order to digitally capture freehand input. Although a connection between the pen digitizer 265 and the serial port interface 206 is shown in FIG. 2, in practice, the pen digitizer 265 may be directly coupled to the processing unit 210, or it may be coupled to the processing unit 210 in any suitable manner, such as via a parallel port or another interface and the system bus 230 as is known in the art. Furthermore, although the digitizer 265 is shown separate from the monitor 207 in FIG. 2, the usable input area of the digitizer 265 may be co-extensive with the display area of the monitor 207. Further still, the digitizer 265 may be integrated in the monitor 207, or it may exist as a separate device overlaying or otherwise appended to the monitor 207.

The computer 200 can operate in a networked environment using logical connections to one or more remote computers, such as a remote computer 209. The remote computer 209 can be a server, a router, a network PC, a peer device or other common network node, and it typically includes many or all of the elements described above relative to the computer 200, although for simplicity, only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets, and the Internet, using both wired and wireless connections.

When used in a LAN networking environment, the computer 200 is connected to the local area network 212 through a network interface or adapter 214. When used in a WAN networking environment, the personal computer 200 typically includes a modem 215 or other means for establishing a communications link over the wide area network 213, such as the Internet. The modem 215, which may be internal or external to the computer 200, may be connected to the system bus 230 via the serial port interface 206. In a networked environment, program modules depicted relative to the personal computer 200, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 2 environment shows one example of an operating environment for various embodiments of the invention, it should be understood that other computing environments also may be used. For example, one or more examples of the present invention may use an environment having fewer than all of the various aspects shown in FIG. 2 and described above, and these aspects may appear in various combinations and subcombinations that will be apparent to one of ordinary skill.

Figure 3:
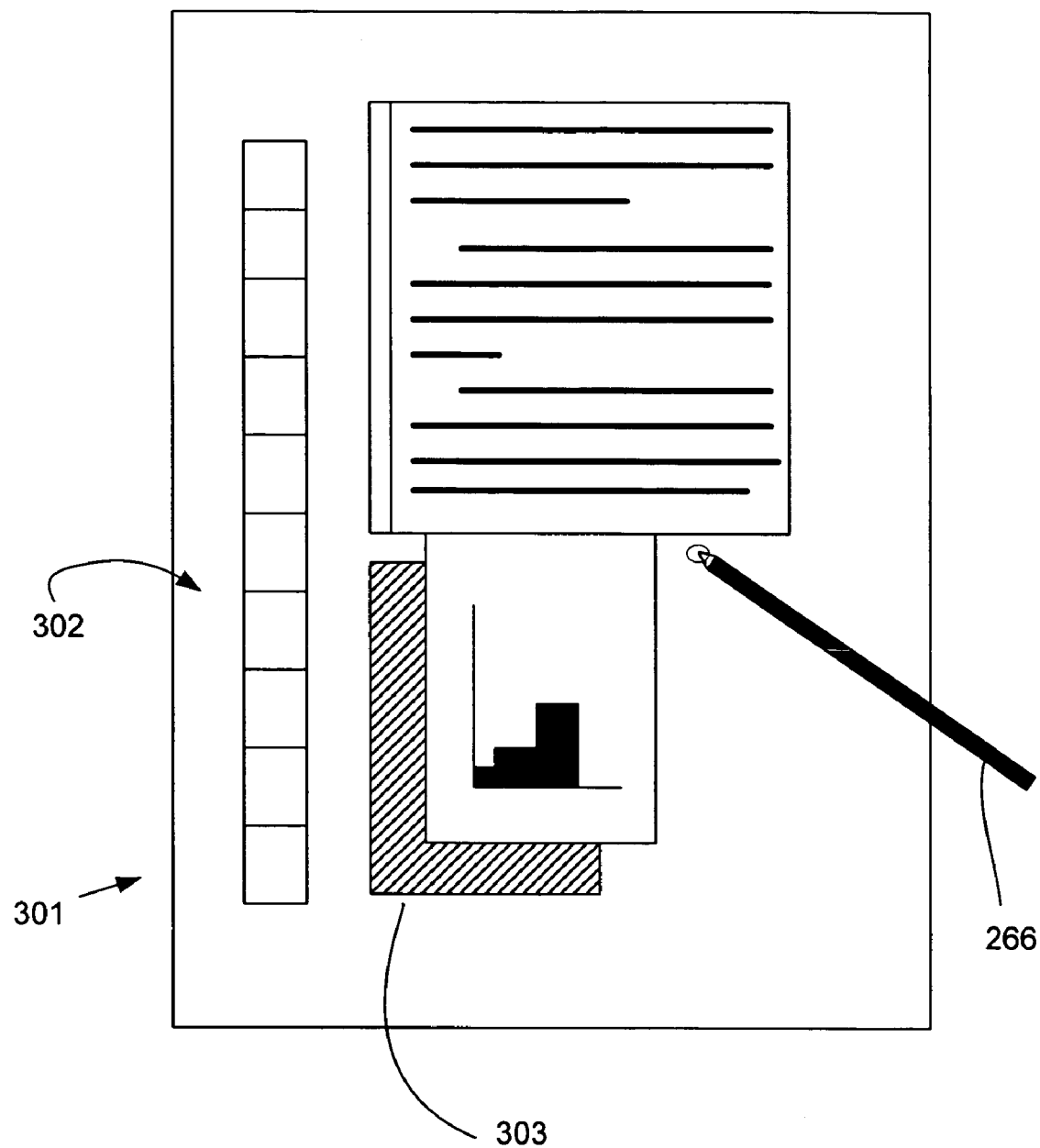

FIG. 3 illustrates a pen-based personal computer (PC) 301 that can be used in accordance with various aspects of the present invention. Any or all of the features, subsystems, and functions in the system of FIG. 2 can be included in the computer 301 of FIG. 3. The pen-based personal computer system 301 includes a large display surface 302, e.g., a digitizing flat panel display, such as a liquid crystal display (LCD) screen, on which a plurality of graphical user interfaces 303, such as windowed graphical user interfaces, is displayed. Using stylus 266, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 301 interprets gestures made using stylus 266 in order to manipulate data, enter text, and execute conventional computer application tasks, such as creating, editing, and modifying spreadsheets, word processing programs, and the like.

The stylus 266 may be equipped with buttons or other features to augment its capabilities. In one example, a stylus 266 could be implemented as a "pencil" or "pen", in which one end constitutes a writing portion. The other end of the stylus 266 then constitutes an "eraser" end, which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

Tool for Handwriting Recognition

Figure 4:
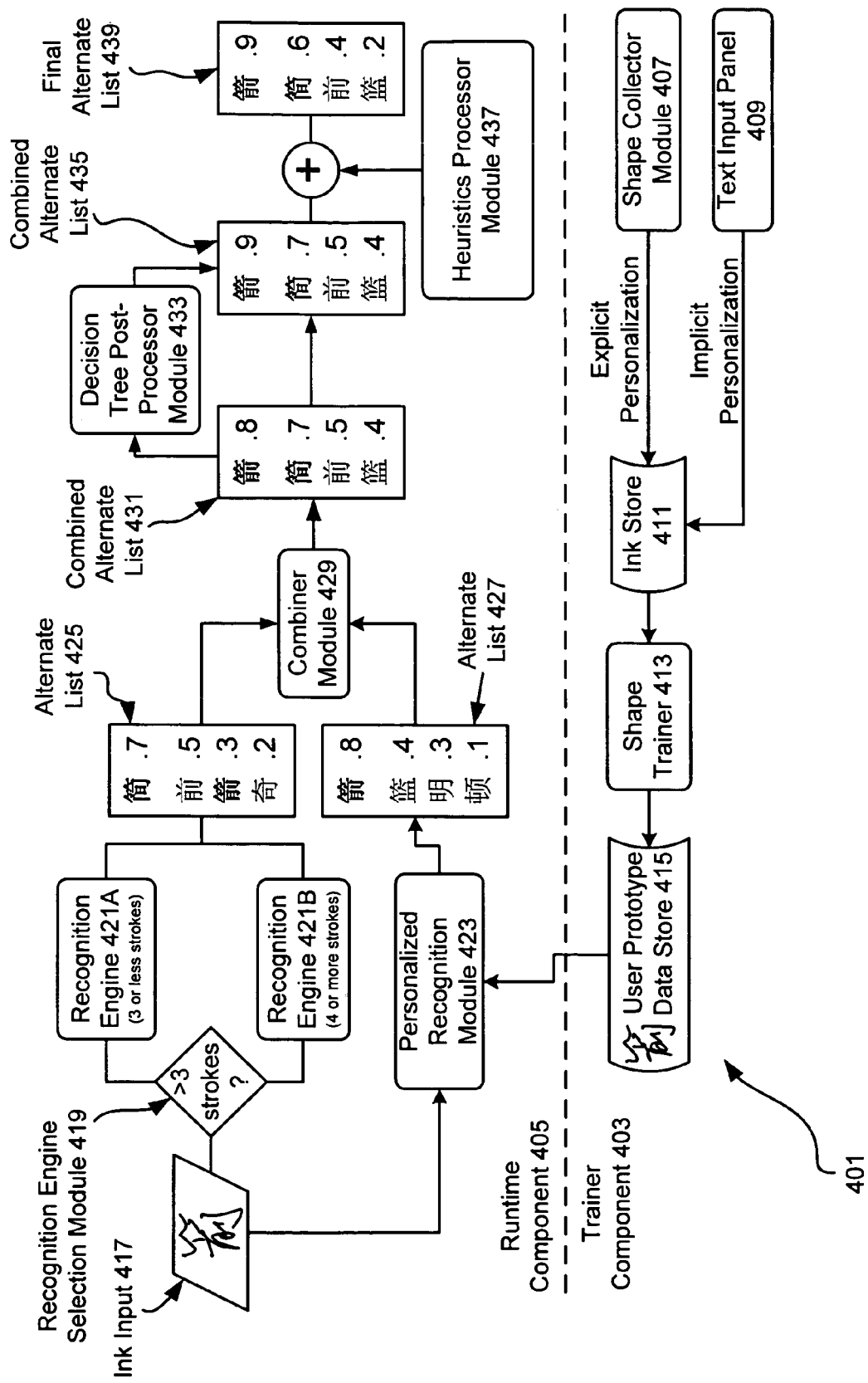
FIG. 4 illustrates one example of a personalized handwriting recognition tool according to various implementations of the invention.

FIG. 4 illustrates one example of a handwriting recognition tool 401 that may be implemented according to various examples of the invention. This system may be implemented using, for example, the computer 200 illustrated in FIGS. 2 and 3. As seen in FIG. 4, the tool 401 has a trainer component 403 and a runtime component 405. The trainer component 403 of the tool 401 is employed to collect examples of an individual's handwriting. The runtime component 405 then is used to recognize an individual's handwriting input. It should be appreciated that the trainer component 403 and the runtime component 405 may operate for that same handwriting input. That is, handwriting input can both be processed by the trainer component 403 for use as a representative handwriting sample and recognized by the runtime component 405.

As will be discussed in more detail below, the illustrated example of the recognition tool 401 employs a prototype-based personalized recognition engine. This type of recognition engine recognizes handwriting input by comparing it with known handwriting samples or "prototypes." Rather than employing only generic handwriting examples as prototypes, however, various examples of the personalized recognition engine may alternately or additionally use handwriting samples obtained from a single individual as prototypes. Still other examples of the invention may employ handwriting samples obtained from a single individual to identify generic handwriting prototypes that most closely correspond to the user's handwriting style. Accordingly, the trainer component 403 is used to collect these personalized handwriting samples. In the illustrated example, the trainer component 403 includes a shape collector module 407, a text input panel 409, and an ink store 411. The trainer component 403 also includes a shape trainer 413 and a user prototype data store 415.

The shape collector module 407 is used to explicitly obtain handwriting or electronic "ink" samples from an individual. For example, the shape collector module 407 may provide a user with a training interface having one or more specific ink labels and prompts for the user to enter ink samples corresponding to the specific ink labels. Thus, the interface may include the Chinese character for "arrow," together with a prompt asking the user to rewrite the character in the user's own handwriting. With various examples of the invention, the shape collector module 407 may also operate in a "trouble shooting" mode. In this mode, the user provides both the label and the electronic ink corresponding to the labels for those characters the recognition tool 401 has had difficulty accurately recognizing. The shape collector module 407 will then provide the ink sample and corresponding ink label to the ink store 411.

While explicit handwriting sample collection will obtain extremely accurate ink sample and ink label pairs, this type of collection can be very tedious and time consuming for a user. Accordingly, various examples of the trainer component 403 will also implicitly obtain ink sample and label pairs from a text input panel 409, such as a text input panel of the type provided by the Microsoft Windows XP Tablet PC operating system. A text input panel 409 is a commonly-employed type of interface that receives a user's handwriting input and provides the handwriting input to the runtime component 405 for recognition. Typically, the recognized text is returned to the text input panel 409 and displayed to the user before insertion into a target software application user interface.

With some embodiments of the invention, the text input interface 303 may display the recognized text before insertion into the target application, together with a drop down list of alternative recognition results, in order to allow a user to correct misrecognized text. If the user does not correct the recognized text, then it can be assumed that the recognized text is an accurate label for the input ink. The text input panel 409 will then provide the ink input and its corresponding recognized text to the ink store 411. It should be appreciated that the text input panel 409 may alternately or additionally be used to explicitly obtain a handwriting sample and associated ink label from a user. More particularly, the user may correct erroneously recognized handwriting input thought the text input panel 409 (by, for example, identifying the correct character using a soft keyboard). The text input panel 409 can then provide the explicitly corrected character and the ink sample to the ink store 411 as an ink and label pair.

In the illustrated example of the recognition tool 401, the trainer component 403 employs both explicit and implicit handwriting sample collection. It should be appreciated, however, that other embodiments of the invention may employ only explicit handwriting sample collection. Still other embodiments of the invention may alternately employ only implicit handwriting sample collection.

Returning now to FIG. 4, the ink store 411 stores the ink and label pairs, and subsequently provides them to the shape trainer 413. The shape trainer 413 then selects user handwriting samples, and provides them to the user prototype data store 415 for use as personalized recognition prototypes during subsequent handwriting recognition operations, or to select generic recognition prototypes that most closely correspond to the user's handwriting style. In many instances, however, an individual's handwriting sample may not actually be representative of that individual's overall handwriting style. For example, an individual may enter ink input while walking, talking, or being otherwise distracted, and thus write a character in a way that is significantly different from how the individual typically writes that character.

Accordingly, these irregular handwriting samples may not be useful for recognizing the individual's normal handwriting and, in fact, may even reduce the overall accuracy of the recognition process. As will be explained in greater detail below, the shape trainer 413 distinguishes handwriting samples that accurately represent an individual's handwriting style from handwriting samples that do not. The shape trainer 413 then provides only those samples that accurately represent an individual's handwriting style to the user prototype data store 416 for use as prototypes during the recognition process.

Figure 5A:
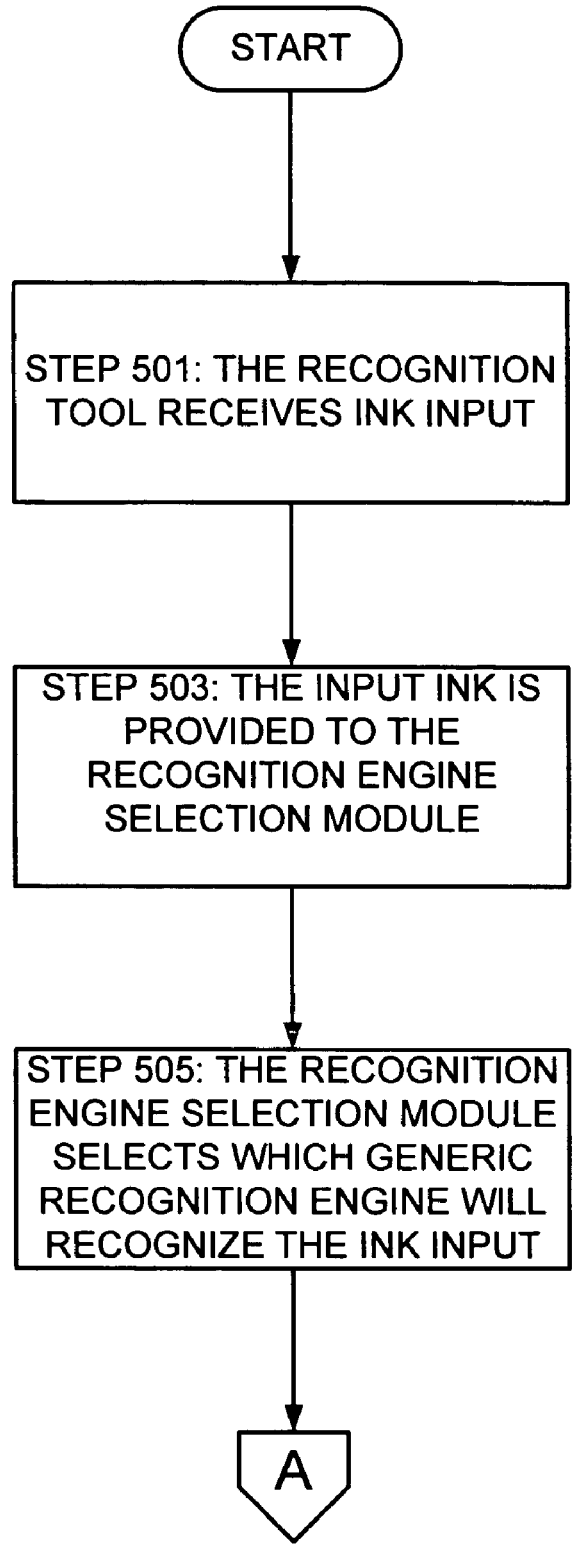
FIGS. 5A-5C illustrate a flowchart showing the operation of the personalized handwriting recognition tool illustrated in FIG. 4.
Figure 5B:
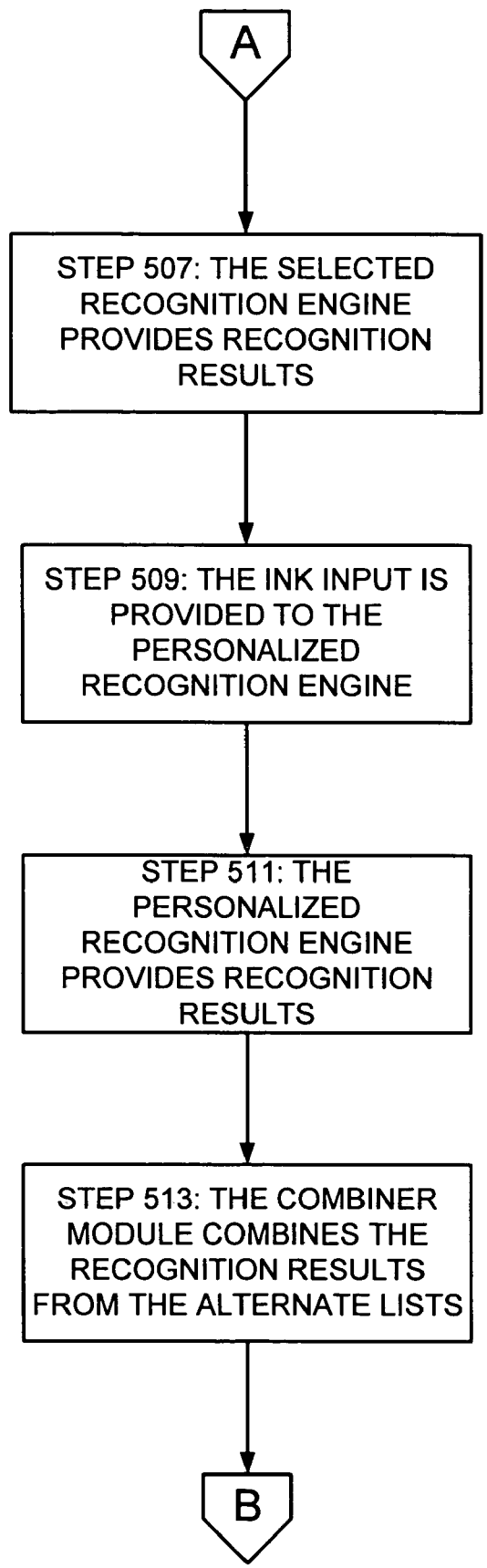
Figure 5C:
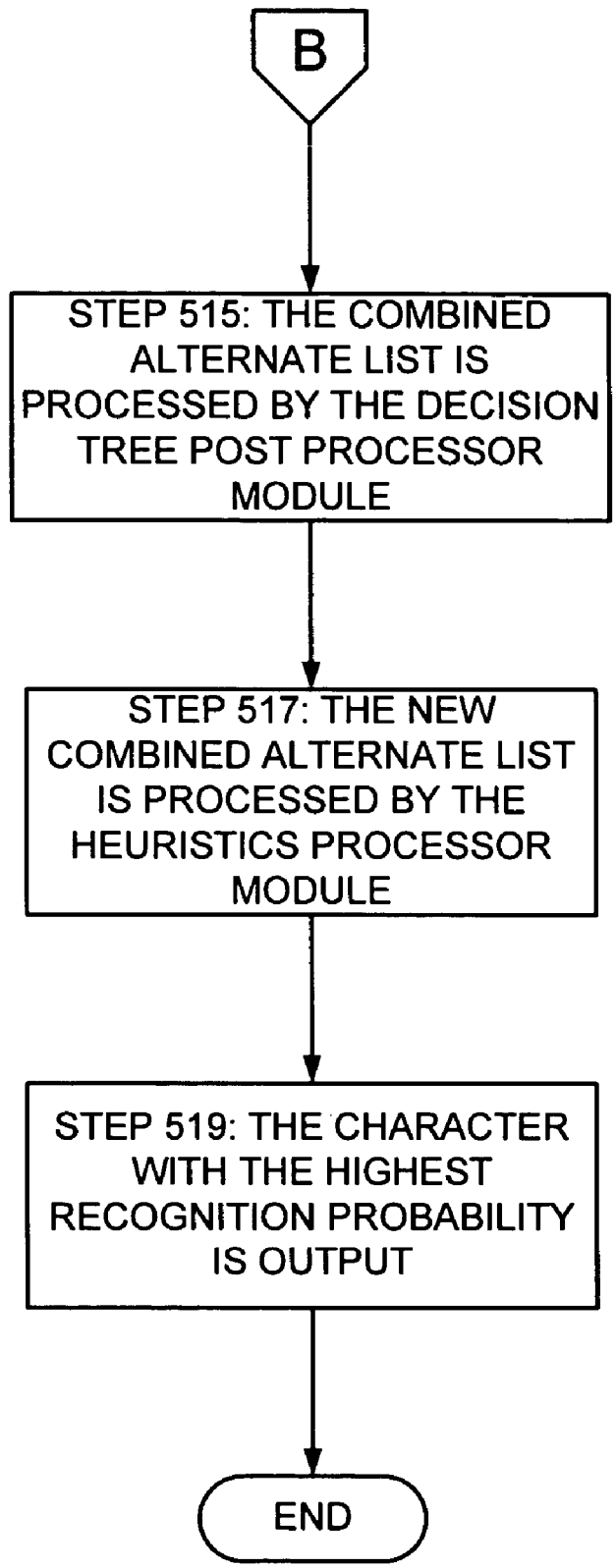

While the trainer component 403 obtains representative handwriting samples, the runtime component 405 of the recognition tool 401 actually recognizes handwriting input 417. As seen in FIG. 4, the runtime component 405 includes a recognition selection module 419, one or more generic recognition engines 421, a personalized recognition module 423, and a combiner 429. The runtime component 405 also may optionally include a decision tree post processor module 433 and a heuristics processor module 437. The operation of the runtime component 405 will be explained with reference to the flowcharts shown in FIGS. 5A-5C.

Initially, in step 501, the recognition tool 401 receives ink input 417. As previously noted, the ink input 417 may be received from the text input panel 409. Alternately or additionally, the ink input 417 may be received from another type of software application configured to receive ink input 417 for recognition, such as a handwriting notation program like Microsoft OneNote or Microsoft Journal, available from Microsoft Corporation of Redmond, Wash. Next, in step 503, the input ink 417 is provided to the recognition engine determination module 419.

In the illustrated example, the recognition tool 401 employs multiple generic recognition engines 421. These generic recognition engines 421 do not employ user-specific information to recognize handwriting, but instead are configured to recognize handwriting for a large group of individuals. Further, particular types of generic recognition engines 421 used in the tool 401 can be selected for complementary recognition results.

Thus, with some embodiments of the invention, the recognition engine 421A may be a neural network-based recognition engine. For example, the recognition engine 421A may employ a combination of a conventional feed-forward neural network and a conventional convolution neural network. As will be appreciated by those of ordinary skill in the art, this type of recognition engine will typically provide better recognition accuracy for handwriting made up of three or fewer strokes. The recognition engine 421B may then employ conventional template matching (also known as "nearest neighbor") recognition techniques that match ink input with the most similar prototype of a character. As will be appreciated by those of ordinary skill in the art, this type of recognition engine usually provides better recognition accuracy for handwriting made up of more than three strokes.

Accordingly, in step 505, the recognition engine selection module 419 selects which generic recognition engine 421 should be used to recognize the ink input 417. In the illustrated example, if the input ink contains three or fewer strokes, then it is provided to the recognition engine 421A for recognition. Alternately, if the input ink contains four or more strokes, then it is provided to the recognition engine 421B for recognition. In step 507, the selected recognition engine 421 provides recognition results in the form of the alternate list 425.

When the ink input 417 is provided to the recognition engine selection module 419 in step 501, it also is provided to the personalized recognition module 423 in step 509. As previously noted, the personalized recognition module 423 recognizes the input ink 417 by matching features of the ink input 417 with features of the ink prototypes stored in the user prototype data store 415. Because the prototypes are representative of the user's individual writing style, if there is a prototype of the same character as the input ink in the user prototype data store, then the personalized recognition module 423 can take into account nuances in the individual writing style during the recognition process, thereby offering improved recognition accuracy. In step 511, the personalized recognition module 423 provides recognition results in the form of the alternate list 427.

As shown in FIG. 4, each alternate list 425 and 427 includes a list of possible characters that the handwriting input may represent. Each character is then associated with a probability that the character corresponds to the handwriting input. For example, the alternate list 425 includes the character "简", along with the associated recognition probability of 0.7 (out of a maximum possible recognition probability of 1.0). The alternate list 425 also includes the character "奇", along with the associated recognition probability of 0.2. This means that the selected generic recognition engine 421 has concluded that the handwriting input is much more likely to be the character "简" than the character "奇".

While both the selected recognition engine 421 and the personalized recognition module 423 produce an alternate list, the alternate lists 425 and 427 may not be equivalent. For example, because the alternate list 427 is produced using prototypes obtained from the user's individual handwriting samples, a character with a recognition probability of 0.8 in the alternate list 427 may be a more likely recognition candidate than another character with the same recognition probability of 0.8 in the alternate list 425. Accordingly, in step 513, the combiner module 429 combines the recognition results from the alternate list 425 with the recognition results from the alternate list 427 to form the combined alternate list 431.

It should be appreciated that alternate implementations of the invention may use any desired combination of conventional or subsequently-developed handwriting recognition engines for recognition engines 421. It also should be appreciated that, with alternate examples of the invention, more than one generic recognition engine 421 may provide recognition results in the form of an alternate list 425. For example, rather than selecting between generic recognition engine 421A and 421B, both generic recognitions may simultaneously process the same electronic ink handwriting ink. With these implementations, the combiner module 429 would then combine the three or more alternate lists 425 and 427 together, either in pairs or all together at one time, to form the combined alternate list 431.

As will be discussed in more detail below, the combiner module 429 may be implemented using a variety of different techniques. For example, with some embodiments of the invention, the combiner module 429 may be implemented using a rule-based process. With still other embodiments of the invention, however, the combiner module 429 may be implemented using a comparative neural network.

Once the combined alternate list 431 is determined, the probabilities associated with each character on this list may optionally be refined using conventional processing techniques. For example, in step 515, the combined alternate list 431 may be processed by the decision tree post processor module 433 to produce a new combined alternate list 435. In the illustrated implementation, the decision tree post processor module 433 may employ the conventionally-known standard cart algorithm for decision tree post processing. As known in the art, this algorithm uses additional, more detailed shape features to differentiate characters with similar shapes, e.g. ± and ± where the difference is in the relative length of two horizontal strokes. It may then reorder the alternate character choices on the alternate list 431 to produce a new combined alternate list 435.

Similarly, in step 517, the combined alternate list 435 may be processed by the heuristics processor module 437 to produce a final alternate list 439. As will be appreciated by those of ordinary skill in the art, the heuristics processor module 437 may employ any desired heuristics to refine the order of the alternate character choices in the combined alternate list 435. Once these and any other desired refinement processes have been completed, in step 519 the character in the final alternate list 439 with the highest recognition probability is output as the character recognized from the handwriting input.

Shape Trainer

Figure 6:
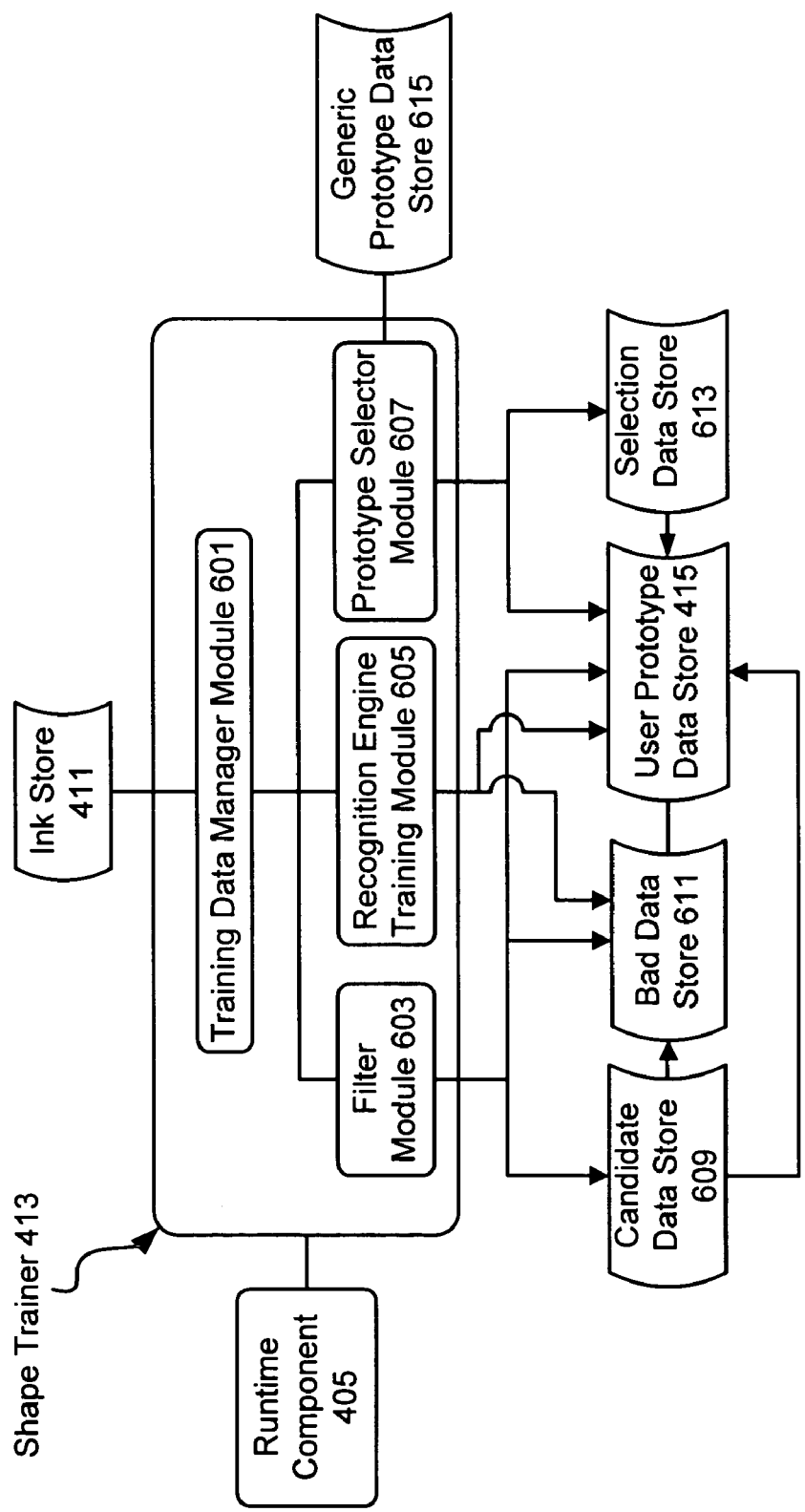
FIG. 6 illustrates a shape trainer that may be implemented according to various examples of the invention.

Referring now to FIG. 6, one implementation of the shape trainer 413 according to various embodiments of the invention will be described. As seen in this figure, the shape trainer 413 includes a training data manager module 601, a filter module 603, a recognition engine training module 605, and a prototype selector module 607. As also shown in this figure, the shape trainer 413 works with a candidate data store 609, a bad data store 611, a selection data store 613, a generic prototype data store 615, and the user prototype data store 415. Each of these modules will now be described in turn.

The training data manager module 601 performs the various tasks for managing the training data (i.e., electronic ink sample and associated label pairs) obtained from the ink store 411. For example, the training data manager module 601 may enumerate the training data, sort training data based on specified criteria, obtain training data for a particular character from the ink store 411, and the like.

As will be described in more detail later, the personalized recognition module 421 according to various examples of the invention employs one or more template-based recognition engines. Accordingly, the user prototype data store 415 stores prototypes of characters reflecting a user's individual handwriting style. With some examples of the invention, however, the personalized recognition module 423 operates in conjunction with one or more generic recognition engines 421. With these examples, it is therefore unnecessary for the user prototype data store 415 to store prototypes of characters that are accurately recognized by the generic recognition engines 421. Rather, it is typically more advantageous to employ the personalized recognition module 423, and thus user prototype data store 415, to recognize handwritten characters that usually will be incorrectly recognized by the generic recognition engines 421. Moreover, it would be desirable to give immediate feedback to the user.

Accordingly, the filter module 603 is a fast trainer module that identifies representative samples of an individual's handwriting while also providing immediate feedback to the user. As will be described in detail, it filters out potentially "bad" (i.e., non-representative) handwriting samples from reaching the user prototype data store 415, and allows representative handwriting samples to be used immediately by the personal recognition module 423. With various examples of the invention, the filter module 603 works continuously on the latest user data. Typically, it will have only a local view of the training data and adds the prototypes to the user prototype data store 413 in an ad hoc fashion.

Some handwriting samples are explicitly provided by an individual, using, for example, the shape collection module 407. With these explicit handwriting samples, the filter module 603 always assumes the data is a representative sample of the individual's handwriting style. It therefore routes explicitly provided handwriting samples to the user prototype data store 415. For handwriting samples that have been implicitly provided by an individual, however, the filter module 603 delays a decision regarding the sample until a similar sample is collected again or no similar sample is collected over a period of time.

More particularly, when the filter module 603 receives a training handwriting sample from the training data manager module 601, it initially compares the sample with handwriting samples of the same character in the candidate data store 609. For a handwriting sample S of character C under consideration, the handwriting sample S is matched against other samples of C in the candidate data store 609 using an ink matching technique. For example, with some implementations of the invention the filter module 603 may use any desired variation of the well known dynamic time warping technique (DTW) (also known as "elastic matching"). The results of the matching technique indicate how close the handwriting sample S resembles other handwriting samples of the character C in the candidate data store 609.

If the distance to the best match S' is below a desired threshold, both S and S' are considered "good" data (i.e., samples that are representative of the individual's handwriting style. The filter module 603 operates on the premise that a user is unlikely to provide very similar "bad" samples twice. If the distance between S and S' is below the desired threshold, and both S and S' have been previously misrecognized by the recognition tool 401 (or, with other examples of the invention, by the personalized recognition module 423), then both S and S' will be added to the user prototype data.

If no close match to sample S is found in the candidate data store 609 and S is not recognized by the recognition tool 401 (or, with other examples of the invention, by the personalized recognition module 423), then the filter module 603 postpones the addition of S to the prototype data store 415. It instead stores the sample S in the candidate data store 609. If no similar handwriting sample is encountered within a specified number of attempts, then the handwriting sample S is removed from the candidate data store 609 and is instead stored in the bad data store 611. Handwriting samples in the bad data store 611 thus will not be employed by the personalized recognition module 423.

It should be appreciated that both the threshold value for determining the closeness between handwriting samples S and S', and the number of attempts that are made to match a handwriting sample S' with another handwriting sample S are implementation dependant. With some examples of the invention, however, the number of attempts may incorporate a weighted penalty based upon the recognition score for the sample, which translate to three "unrelated" matchings (i.e., the matching score is above the INKMATCH_TOP 1CORRECT_MAX_DIST discussed in detail below).

It also should be appreciated that, with various examples of the invention, the bad data store 611 may be omitted. In the described implementation, when a handwriting sample is determined not to be representative of the individual's handwriting style, the sample is stored in the bad data store 611 rather than deleted. This allows the sample to later be used if it was inadvertently assigned to the bad data store 611. With alternate examples of the invention, however, a handwriting sample that is determined not to be representative of the individual's handwriting style may simply be deleted.

While the above-described implementation of the filter module 603 employs an algorithm based on matching distance alone, with still other implementations the filter module 603 may use a neural network based filter. More particularly, the filter module 603 may employ a neural network that has been trained to distinguish "good" or representative samples from "bad" or less representative samples. With various examples of the invention, the training procedure involves the standard feed-forward back-propagation through the network.

The training set for the neural network can be derived, for example, by using a probabilistic model that emulates the behavior of someone using the recognition tool 401 together with a combination of explicitly and implicitly collected data. The input features for the neural network may include ink shape features, features of the label for the ink sample, and features of the recognition of the ink given the label or masked scores. For example, the ink shape features may include the number of strokes, and the complexity of the shape. The features of the label may include, for example, an unigram score, category features, and the print stroke count, while the features of the recognition of the ink may include a system score, best score to match to prototypes of the label in the user prototype data store 415, best score to match to samples of the label in the candidate data store 609.

The input for the neural network also may include features of the highest-ranked alternate choice result (sometimes referred to as the "top1" result) for the recognition system 401, features of the top1 result obtained by matching the ink to prototypes in the user prototype data store 415, and features of the top1 result obtained by matching the ink sample to samples in the candidate data store 609. The features of the top1 result for the recognition system 401 may include, for example, the recognition score, the unigram score, the category features of the top1 result, and a flag indicating whether the top1 result is the same as the label for the ink sample. The features of the top1 result obtained by matching the ink to prototypes in the user prototype data store 415 may include, for example, the matching score, the unigram score, category features of the top1 result, and a flag indicating whether the top1 result is the same as the label for the ink sample. The features of the top1 result obtained by matching the ink sample to samples in the candidate data store 609 may then include the matching score, the unigram score, category features of the top1 result, and a flag indicating whether the top1 result is the same as the label for the ink sample.

Once personalization training samples have been collected from a set of users to develop the system, a user's behavior can be divided into three different possible scenarios, as will be explained in more detail below. With these different scenarios, a probability model can then be used to generate training data by simulating the user's behavior of ink donation in terms of explicit data and implicit data and the percentage of bad samples in implicit data.

To generate training data for a neural network based filter module 603, the matching distance score algorithm discussed in detail above can be used to both to train the network and produce training examples of the data stores 609 and 415. Before a sample S of a character (or "codepoint") C is used to train the neural network, the recognition tool 401 (or with various examples of the invention, the personalized recognition module 423) performs the recognition process on S. The results will then be the alternate choice list $\{R_1, R_2, \ldots, R_i, \ldots R_N\}$. Assuming that $R_j$ is the label for the sample S, the pair (S, Ri) can then be used to generate the features for the neural network described in detail above. The label is 1 if $R_j$ equals C, and 0 otherwise. The feature vector and the label together make up one training sample for the neural network. Based on the above procedure, N examples of training data can be generated from one ink sample. It also should be noted that the training example of the user data store can be reset (i.e., its content cleared) using a probability model to simulate a user's behavior with regard to restarting the personalization training for the tool 401.

For example, with one implementation of a neural network-based filter module 603, the parameters in the following user model are randomly picked from the range at each resetting point.

User Behavior Simulation Model:
0. correct Top1 (TIP gives correct result)
1. correct Top7, but not Top1 (correct result in TIP altlist)
2. misrecognition (correct result not in TIP altlist)

The following parameters can then be used to model user behavior in scenario i ratio(i): ratio of data in scenario i for a user.
eProbImplicit(i): prob of donating implicit data
eProbCorrect(i): prob of selecting correct altnate (good implicit data)
eProbUseTop1(i): prob of using Top1 as wrong label (noise implicit data)

The model also implicitly models the probability of user overwriting, which translates to
not using the training data.
eProbOverwrite(i)=eProbImplicit(i)*(1-eProbCorrect(i)*(1-eProbUseTop1 (i))/7 ( i=0,1)
eProbOverwrite(2)=eProbImplicit(i)*(eProbCorrect(i)+((1-eProbCorrect(i))*(1-eProbUseTop1(i))/7)
probablity of explicit data:
eProbExplicit=sum$_i${1-eProbImplicit(i))*ratio(i)} (i=0,1,2)
eProbGoodImp=sum$_i${ratio(i)*eProbImplicit(i)*eProbCorrect(i)} (i=0,1)
eProbNotUseImp=sum$_i${ratio(i)*eProbOverwrite(i)} (i=0,1,2)
eProbBadImp=sum$_i${ratio(i)*eProbImplicit(i)*(1-eProbCorrect(i))}-eProbNotUseImp (i=0,1,2)

Accordingly, in this manner, a neural network can be trained to function as the filter module 603 to filter out "bad" handwriting samples that are not representative of an individual's handwriting style.

Turning now to the recognition engine training module 605, this module 605 performs full scale recognition engine training using all of the collected data in a manner well-known in the art. For example, depending upon the recognition engine or engines employed by the personalized recognition module 423, the recognition engine training module 605 may employ the prototype training techniques described in U.S. Patent Application No. US 2004/0002986, entitled "Reducing And Controlling Sizes Of Prototype-Based Recognizers" filed on Jun. 28, 2002, and naming Rowley et al. as inventors, and in U.S. Patent Application No. US 2004/0002940, entitled "Reducing And Controlling Sizes Of Model-Based Recognizers" filed on Jun. 28, 2002, and naming Meek et al. as inventors.

As will be appreciated by those of ordinary skill in the art, the recognition engine training module 605 has a global view of data, and thus can be expected to make better selections of handwriting samples that are representative of an individual's handwriting style than the filter module 603. The training time for the recognition engine training module 605 is also much longer than the training time for the filter module 603, however, so it may only be invoked irregularly without substantially slowing the operation of the recognition system.

In the illustrated example of the tool 401, the prototype selector module 607 comprises two trainers: the user prototype selector (UPS) and the system prototype selector (SPS). The prototype selector module 607 uses the positive and negative usage patterns of the user-specific and generic prototypes to further improve the user personalized recognition process. More particularly, the user prototype selector operates on the user-specific prototypes stored in the user prototype data store 415, while the system prototype selector operates on the generic prototypes stored in the generic prototype data store 615 used by the generic recognition engines 412.

For every prototype P for character C in a prototype data store, the selector records when the prototype P was last used to recognize ink data. It also records when the use of the prototype P assisted in the accurate recognition of C from an electronic ink input, and how many times the use of the prototype P hurt caused the misrecognition of other characters. This information recorded by the prototype selector module 607 then is stored in the selector data store 613.

As will be appreciated by those of ordinary skill in the art, the information recorded by the prototype selector module 607 can be used to adjust the weight of each prototype P, or used to create penalties or bonuses to the matching score (i.e., the score quantifying the similarity between the prototype and an input sample of electronic ink). When the desired criteria are met, such as, for example, when the number of times that the prototype P has caused the misrecognition of another character is larger than the number of times that the prototype assisted in the accurate recognition of C, the prototype selector module 607 may determined that the prototype P is not a beneficial representative prototype of the character C. The prototype selector module 607 can then remove the prototype P from the user prototype data store 415. Alternately or additionally, the prototype selector module 607 may mask off the prototype P from the generic prototype data store 615.

It should be appreciated that recognition engine training module 605 and the prototype selector module 607 are offline trainers, while the filter module 603 is an online trainer. It also should be noted that each of the filter module 603, the recognition engine training module 605 and the prototype selector module 607 both use data in the user prototype data store 415 and write data to the user prototype data store 415 as well. In this manner, the shape trainer 413 ensures that the user prototype data store and/or the generic prototype data store 615 collects and maintains prototypes that assist in the accurate recognition of an individual's handwriting.

As previously noted, instead of adding user-specific prototypes to the user prototype data store 415, with various examples of the invention the shape trainer 413 may instead identify generic prototypes (in the user prototype data store 415 or the generic prototype data store 615) that most closely resemble an individual's handwriting style. More particularly, once the shape trainer 413 has identified handwriting samples that are representative of a user's handwriting style, the shape trainer 413 can then identify existing generic prototypes that most closely match those samples. The personalized recognition module 423 and/or one or more of the generic recognition engines 421 can use the identified generic prototypes to recognize electronic ink input.

Personalized Recognition Module

Figures 1, 7:
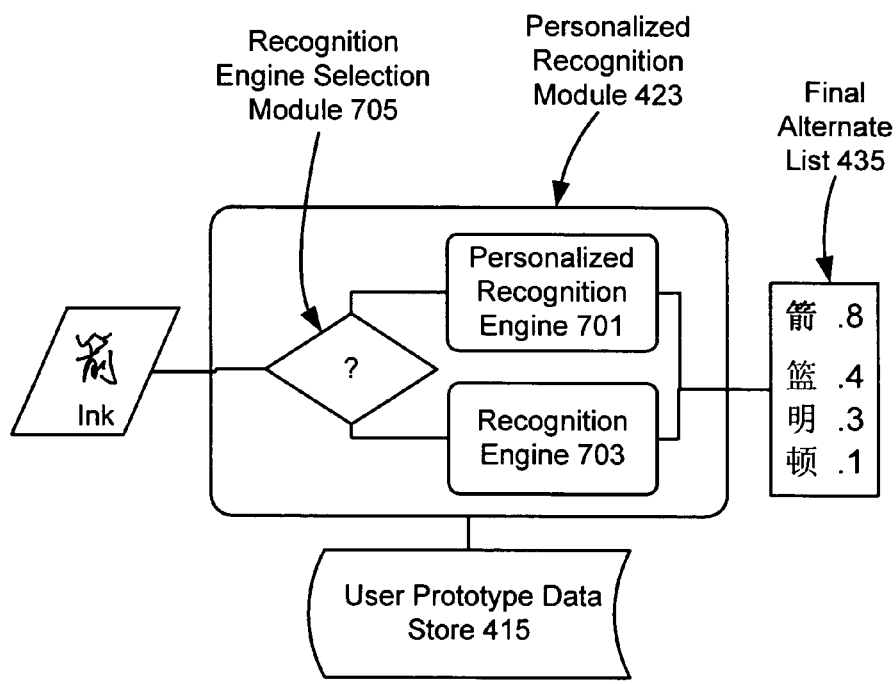
FIG. 1 illustrates ten cursive samples of the Chinese character 箭 (meaning "arrow") obtained from the same writer.
FIG. 7 illustrates a personalized recognition module that may be implemented according to various examples of the invention.

FIG. 7 illustrates an example of a personalized recognition module 423 that may be employed by various examples of the invention. As seen in this figure, the personalized recognition module 423 includes two alternate recognition engines 701 and 703 to match ink to user prototypes. The personalized recognition engine 701 may be, for example, a prototype-based recognition engine as described above, which employs the prototypes stored in the user prototype data store 415. With some examples of the invention, it may uses the same featurization and cost evaluation mechanism as the generic recognition engine 421 A described above, but perform dynamic time warping (DTW) matching to +/−5 spaces after the stroke segmentation.

The recognition engine 703 may then be implemented using a recognition engine that uses DTW ink matching of re-samples ink traces. This type of recognition engine is well-known in the art, and examples of this type of engine are described in, for example, "The Writer Independent Online Handwriting Recognition System Frog On Hand And Cluster Generative Statistical Dynamic Time Warping, *IEEE Transactions On Pattern Analysis And Machine Intelligence*, Vol. 26, No. 3, March 2004. It may use, for example, (x, y, θ) at each point as features, and then match the ink to user prototypes at +/−5 strokes. Of course, still other implementations of the invention may alternately or additionally include a neural network-based handwriting recognition engine as described in detail above. As also disused in more detail above, the recognition engine selection module 705 then decides which recognition engine to use based on any criteria appropriate to the recognition engine types, such as the number of strokes in the ink input.

Rule-Based Combiner

As previously noted, a combiner module 429 is used to combine the recognition results from the personalized recognition module 423 and the recognition engines 421. With various examples of the invention, the combiner module 429 may be implemented using a rule-based combiner that attempts to merge the alternate lists 425 and 427 together. The probability given to each alternate character on the lists reflects the confidence of the recognition engine that produced the alternate character.

Because different recognition engines give different probability distributions to its alternate characters, however, the combiner module 429 employing the rule-based combiner adjusts the probability distributions from different recognition engines to a comparable range by using prior knowledge and statistical information of the matching distance on correctly and incorrectly recognized samples.

Figure 8:
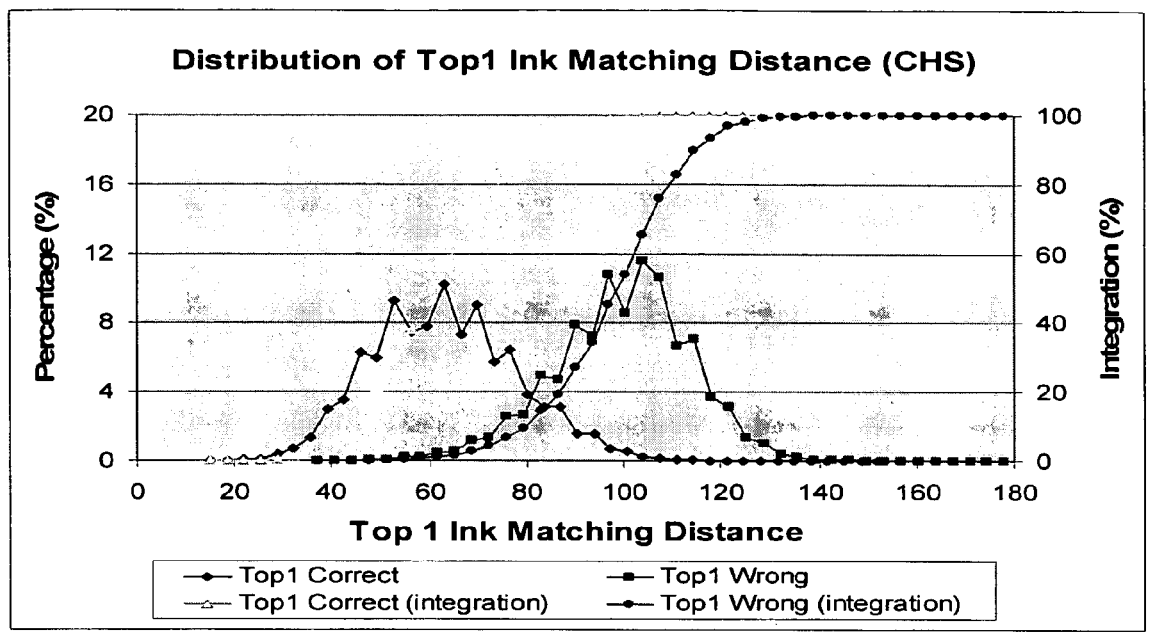
FIG. 8 illustrates the top matching distances of recognition results from different recognition engines.

FIG. 8 shows the distribution of the matching distances of correctly recognized and incorrectly recognized top result from the CHS training-set. There is only relatively small overlap between two distributions, so the top distance can be used as a reasonable measure of how confident each recognition engine regarding the recognition results. Two thresholds are calculated from the integration curve:

INKMATCH_TOP1CORRECT_MAX_DIST which is the distance corresponding to 90% on the top1 correct integration curve INKMATCH_TOP1WRONG_MIN_DIST which is the distance corresponding to 5% on the top1 wrong integration curve.

If the distance of the top alternate is larger than INKMATCH_TOP1CORRECT_MAX_DIST, it is very likely not correct so the result can be discarded from the recognition results. Otherwise, the distance is converted to a probability using, for example, the well-known softmax algorithm. If the top1 distance is larger than INKMATCH_TOP1WRONG_MIN_DIST, it means that there is certain probability that the top1 result is not correct. That probability is taken into account when using softmax. Supposing there are N alternates with matching distance $d_i$ where $d_i \leq d_{i+1}$ (i=0, ..., N−2), the probability for alternate i is defined in the equation:

$$p_i = \frac{e^{-(d_i - d_{min})}}{\sum_{j=0}^{N-1} e^{-(d_j - d_{min})}} \text{ where } d_{min}$$

$$= \min(d_0, \text{INKMATCH\_TOP1WRONG\_MIN\_DIST})$$

Thus, the results produced by the handwriting recognition engines 701 and 703 are normalized with respect to each other, and thus can be combined.

Neural Network Based Combiner

The combiner module 429 also may be implemented using a neural network based comparator, such as a comparative neural network. A comparative neural network is a standard feed-forward neural net that compares two items and chooses one of them. Its input features consist of three distinct parts: context features that describe the current context (i.e., the input) of the network, description features that describe the fist item, and description features that describe the second item. The network then compares the two items and chooses the one that 'matches' the context features better. Typically, the output of a comparative neural network would be 0 or 1 upon choosing the first or the second item, respectively.

With various examples of the invention, the combiner module 429 may be implemented using a four-layer fully-connected feed-forward network. More particularly, the network has one input layer, two hidden layers, and one output layer. In addition to the usual connections between subsequent layers, the network has cross-connections from the first hidden layer to the output layer. With some examples of the network, it has 46 inputs, with 70 units in the first hidden layer, 35 units in the second layer, and one output.

Assuming a comparative network that can compare any pair among a given collection of items, any conventional sorting algorithm can be used to sort (i.e., order/rank) the collection. For example, various implementations of the combiner module 423 may employ the well-known "mergesort" sorting algorithm.

A training set can be generated and the neural network may be trained as will be described below. The training set will include an input x and its correct classification $\sigma(x)$. For use with the combiner module 429, $\sigma(x)$ is the intended classification of the ink. For example, if a user writes ink that corresponds to a character 九, then $\sigma(x)$ is an encoding (i.e., a Unicode representation) of 九. Each base-classifier (e.g., recognition engine) is run to obtain an ordered list of alternative classifications of x from each base-classifier. Those alternative lists are merged together to form common classifications. If the correct classification $\sigma(x)$ does not appear in the combined list, then the list is discarded. Otherwise the training process proceeds to the next step.

The context features $C(x)$ are then extracted from x, and $\sigma(x)$ is combined with all erroneous classifications $\lambda(x)$ in the combined list creating comparative training samples of the form (C(x), D($\sigma(x)$), D($\lambda(x)$), 0) or (C(x), D($\lambda(x)$), D($\sigma(x)$), 1)

where D( ) is a function that maps classifications to their description features, as will be described in more detail below.

More particularly, the combiner module 429 may employ a neural network that has been trained to distinguish the better candidate from among the alternate character candidate lists 425 and 427. Using a number of training examples (where the better candidate is identified), a feed-forward neural network can be trained using the well-known back-propagation algorithm. The training set may be derived, for example, by using a probabilistic model that emulates a user's behavior during use of the handwriting recognition tool 401. The input features may be, e.g., the matching scores of the candidates, their stroke counts and unigrams, the stroke count and complexity of the ink, as well as a number of categorical features of the candidates (such as a Kanji character flag when the system 401 is used to recognize Kanji, a number flag, or a punctuation flag) and Boolean flags that denote whether the candidate is present in the user prototype database. Furthermore, extra unfolding features can be used to distinguish between similar character like o and O.

The training system accepts a number of input parameters (such as reset probabilities and decays, ink-matching options, type of personalization, or number of training epochs) that are used to control the generation of the training set and the training procedure. Reset probabilities define the probability that a user will reset the user prototype data store 415 at each training sample. During training, each user initially starts with an empty database. When a sample is to be added to it, the reset probability is used to decide whether to add the sample or reset the database to null and start all over. In the latter case, the reset probability decays (it is multiplied by a decay constant which is between 0 and 1).

This mechanism is used in order to simulate the higher chance of smaller databases and user behavior. For example, a higher initial reset probability may correspond to a user who is quite unfamiliar with the system and may reset the contents of the user prototype data store 415 quite often, while a smaller probability corresponds to a more experienced user. Thus, low (near 0) decay constants correspond to users who learn fast and so their probability of resetting the user prototype data store 415 decreases quickly. Conversely, high decay constants (near 1) indicate users who learn more slowly and who keep resetting their user prototype data store 415.

Given an input x, C(x) may be a vector with the following features:
feature 1: number of strokes in the ink
feature 2: stroke complexity of ink
features 3-6: width, height, and top/-left coordinates of the bounding box (where the bounding box is defined as the minimum rectangle enclosing the ink.)

Given a classification (character) c, D(c) then is a vector with the following features::
feature 1: system score for c (obtained from the system recognizers)
feature 2: system score for c (obtained from the user database)
feature 3: typical number of strokes when writing c
feature 4: unigram value for c
feature 5: whether the user database contains a sample for c (Boolean)
feature 6: whether the system score for c is valid or default (Boolean)
features 7-12: category features for c (alphanumeric, Kanji, Hiragana, etc.)
features 13-16: average width, height, and top/-left coordinates of c's bounding box
features 17-20: standard deviation of features 13-16 for c.

It should be noted that features 13-20 are unfolding features, and the values for each classification c are computed from a large set of ink data.

Given a set of training ink data $x_1, \ldots, x_N$, a training set can be generated for the comparative network by performing the previous steps on each ink sample $x_i$, i=1, . . . , N. This is referred to as the comparative training set and it is randomized (by shuffling) before it is used to begin training the network, in order to eliminate chance regularities in it that may have to do with the order that is used to process the ink samples.

After the comparative neural network has been trained, it can then be used to aggregate the base-classifiers. More particularly, given input x, each of the base-classifiers runs and generates an ordered list of alternative classifications of x. Those alternative lists are merged together, thereby coalescing common classifications. Next, the context features C(x) are extracted from x. The sorting algorithm then runs on the combined list. The algorithm would run the comparative neural network on C(x) and pairs of alternative classifications from the combined list. The sorted list is then returned, and the top element in the returned list is the final classification of x.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method implemented by a stylus-based personal computer for recognizing handwriting of a particular user, the method comprising:
   storing a set of handwriting samples of a particular user;
   receiving a handwritten inputs from the particular user for recognition;
   separately providing the handwritten input to first and second recognition engines, respectively, each of the first and second recognition engines applying a separate process for recognizing the handwritten input;
   producing by the recognition process of the first recognition engine a first list of alternative classifications of the handwritten input by matching features of the handwritten input to features of the stored handwriting samples of the particular user, each of the classifications of the first list comprising a potential character with an associated recognition probability;
   producing by the recognition process of the second recognition engine a second list of alternative classifications of the handwritten input without utilizing the stored handwriting samples, the process of the second recognition engine being designed to generically recognize handwriting for a plurality of users, each of the classifications of the second list comprising a potential character with an associated recognition probability;
   applying data of the handwritten input, the first list, and the second list to a comparative neural network for processing, the applied data including a context feature of the handwritten input, a descriptive feature of a potential character and an associated recognition probability from the first list, and a descriptive feature of a potential character and an associated probability from the second list;
   outputting a character as a recognition result of the handwritten input based on the processing of the neural network, the outputted character being one of the potential characters in the first and second lists; and
   adapting the stored set of handwriting samples by adding a previously received handwritten input from the particular user to the set before a subsequently received handwritten input from the particular user is provided to the first and second recognition engines,
   wherein the neural network is configured to merge the first and second lists by coalescing common classifications of the handwritten input in the first and second lists,
   wherein the neural network is based on a computational model comprising a group of interconnected processing units, and
   wherein the recognition process of the first recognition engine matches context features of the subsequently received handwritten input to the context features of the adapted set of handwriting samples to produce the first list for the subsequently received handwritten input.

2. The method recited in claim 1, wherein the first and second lists are generated by respective handwriting recognition engines.

3. The method recited in claim 1, wherein
   the neural network merges the first and second lists into a combined list of alternative classifications, each classification of the combined list comprising a potential character from at least one of the first and second lists, the neural network producing an associated recognition probability for each potential character in the combined list, and
   the outputting step outputs the potential character in the combined list having a highest associated recognition probability as the recognition result.

4. The method recited in claim 1, further comprising merging the first and second lists of alternative classifications, each classification in the combined list comprising a potential character from at least one of the first and second lists, such that the potential characters are ordered according to likelihood of representing the handwritten input.

5. The method recited in claim 1, wherein the neural network employs a mergesort process to compare potential characters from the first and second lists.

6. The method of claim 1, further comprising:
   selecting the first recognition engine from a plurality of generic recognition engines based on a number of strokes in the handwritten input;
   using the selected generic recognition engine to generate the second list.

7. A classification tool implemented in a computer, comprising:
   a stylus-based input device for receiving a handwritten inputs from a particular user;
   a storage device for storing a set of handwriting samples of the particular user;
   a user-specific recognition engine configured to apply a first recognition process for producing a first list of alternative classifications of the handwritten input by matching features of the handwritten input to features of the stored handwriting samples of the particular user, each of the classifications of the first list comprising a potential character with an associated recognition probability;
   a generic recognition engine configured to apply a second recognition process for producing a second list of alternative classifications of the handwritten input without utilizing the stored handwriting samples of the particular user, the generic recognition engine being designed to generically recognize handwriting for a plurality of users, each of the classifications of the second list comprising a potential character with an associated recognition probability;
   a comparative network that receives and processes data including a context feature of the handwritten input, a descriptive feature of a potential character and an associated probability of the first list, and a descriptive feature of a potential character and an associated probability of the second list, wherein the classification tool is configured to output a recognition result of the handwritten input based on the processing of the neural network, the outputted character being one of the potential characters in the first and second lists; and
   a trainer component that adapts the stored set of handwriting samples by adding a previously received handwritten input from the particular user to the stored set before a subsequent handwritten input is received from the particular user,
   wherein the user-specific recognition engine and the generic recognition engine are configured such that the first and second recognition processes are applied separately to the handwritten input, wherein the neural network is configured to merge the first and second lists by coalescing common classifications of the handwritten input in the first and second lists, wherein the neural network is based on a computational model comprising a group of interconnected processing units, and wherein the recognition process of the user-specific recognition engine is configured to match context features of the subsequently received handwritten input to the context features of the adapted set of handwriting samples in order to produce the first list for the subsequently received handwritten input.

8. The classification tool recited in claim 7, wherein the neural network is configured as a comparative neural network employing a mergesort process to compare potential characters from the first and second lists.

9. The classification tool of claim 7, further comprising:
a plurality of generic recognition engines;
a recognition engine selection module for selecting one of the generic recognition engines to produce the first list based on a number of strokes in the handwritten input.

10. The classification tool recited in claim 7, wherein
the neural network is configured to merge the first and second lists into a combined list of alternative classifications, each classification of the combined list comprising a potential character from at least one of the first and second lists, the neural network producing an associated recognition probability for each potential character in the combined list, and
the classification tool outputs the potential character from the combined list that has a highest associated recognition probability as the recognition result.

11. A computer-implemented method for recognizing handwritten characters, comprising:
storing a set of handwriting samples of a particular user;
providing first and second generic recognition engines configured to generically recognize handwritten characters for a plurality of users, the first generic recognition engine employing a neural network-based technique to recognize the handwritten characters, the second generic recognition engine employing a nearest neighbor matching technique to recognize the handwritten characters, wherein neither the technique of the first generic recognition engine nor the technique of the second recognition employs the stored set of handwriting samples to recognize the handwritten characters;
providing a user-specific recognition engine configured to recognize a particular user's handwritten characters by matching features of the handwritten characters to features of stored handwriting samples obtained from the particular user;
receiving a handwritten input from the particular user;
selecting between the first and second generic recognition engines based on a number of strokes in the handwritten input;
applying the handwritten input to the selected generic recognition module to generate a first list of potential characters, the potential characters in the first list being associated with recognition probabilities;
applying the handwritten input to the user-specific recognition engine to generate a second list of potential characters, the potential characters in the second list being associated with recognition probabilities, wherein the handwritten input is applied separately to the selected generic recognition engine and the user-specific recognition engine;
using a comparative neural network to process data of the handwritten input, the first list, and the second list;
choosing one of the potential candidates from the first and second list as a recognition result for the handwritten input based on the processing of the neural network; and
adapting the stored set of handwriting samples by adding a previously received handwritten input from the particular user to the set before a subsequently received handwritten input from the particular user is provided to the first and second recognition engines.

wherein the neural network merges the first and second lists by coalescing common classifications of the handwritten input in the first and second lists, wherein the neural network is based on a computational model comprising a group of interconnected processing units, and wherein the recognition process of the first recognition engine matches context features of the subsequently received handwritten input to the context features of the adapted set of handwriting samples to produce the first list for the subsequently received handwritten input.

12. The method recited in claim 11, wherein
the neural network merges the first and second lists into a combined list of alternative classifications, each classification of the combined list comprising a potential character from at least one of the first and second lists, the neural network producing an associated recognition probability for each potential character in the combined list, and
the choosing step chooses the potential character from the combined list that has a highest associated recognition probability as the recognition result.

* * * * *